United States Patent
Brillon

(10) Patent No.: US 6,671,599 B2
(45) Date of Patent: Dec. 30, 2003

(54) PROCESS FOR MONITORING THE STATE OF A SAFETY FACILITY

(75) Inventor: Alain Brillon, Villeneuve Tolosane (FR)

(73) Assignee: Siemens VDO Automotive, Toulouse Cedex (FR)

( * ) Notice: Subject to any disclaimer, the term of this patent is extended or adjusted under 35 U.S.C. 154(b) by 22 days.

(21) Appl. No.: 10/061,262

(22) Filed: Feb. 4, 2002

(65) Prior Publication Data

US 2002/0107622 A1 Aug. 8, 2002

(30) Foreign Application Priority Data

Feb. 2, 2001 (FR) .............................. 01 01423

(51) Int. Cl.⁷ ................................ G06F 7/00
(52) U.S. Cl. ...................................... 701/48
(58) Field of Search ........................ 701/48; 340/500, 340/505, 531, 532, 534, 5.1, 5.23, 5.33

(56) References Cited

U.S. PATENT DOCUMENTS

| | | | |
|---|---|---|---|
| 5,107,425 A | 4/1992 | Donges et al. | 364/424.03 |
| 6,097,301 A | 8/2000 | Tuttle | |
| 6,140,938 A * | 10/2000 | Flick | 340/825.69 |
| 6,522,027 B1 | 2/2003 | Morillon et al. | |
| 2001/0038328 A1 | 11/2001 | King et al. | |

FOREIGN PATENT DOCUMENTS

| | | |
|---|---|---|
| DE | 197 41 438 | 12/1998 |
| EP | 0 689 161 A2 | 12/1995 |
| EP | 0 693 741 A2 | 1/1996 |
| EP | 0 833 026 A1 | 4/1998 |
| EP | 1 050 839 A1 | 11/2000 |
| EP | 1 099 814 A1 | 5/2001 |
| FR | 2 752 651 | 2/1998 |
| WO | WO 90/09649 | 8/1990 |

* cited by examiner

Primary Examiner—Yonel Beaulieu
(74) Attorney, Agent, or Firm—Young & Thompson

(57) ABSTRACT

A first computer (6) is linked to the safety facility (4) and a second computer (12) intended to control an actuator (2) interrogates prior to any command to turn on and/or turn off the actuator (2) the first computer (6) as to the state of the safety facility (4). The second computer (12) interrogates the state of the safety facility (4) directly by sending an encrypted message. The first computer (6) forwards in one direction the question of the second computer (12) to the safety facility (4) and in the opposite direction the response of the latter. The second computer (12) verifies the consistency of the response received. The encryption code is known to the second computer (12) and to the safety facility (4) but is unknown to the first computer (6). The process is applicable to the automobile field.

20 Claims, 1 Drawing Sheet

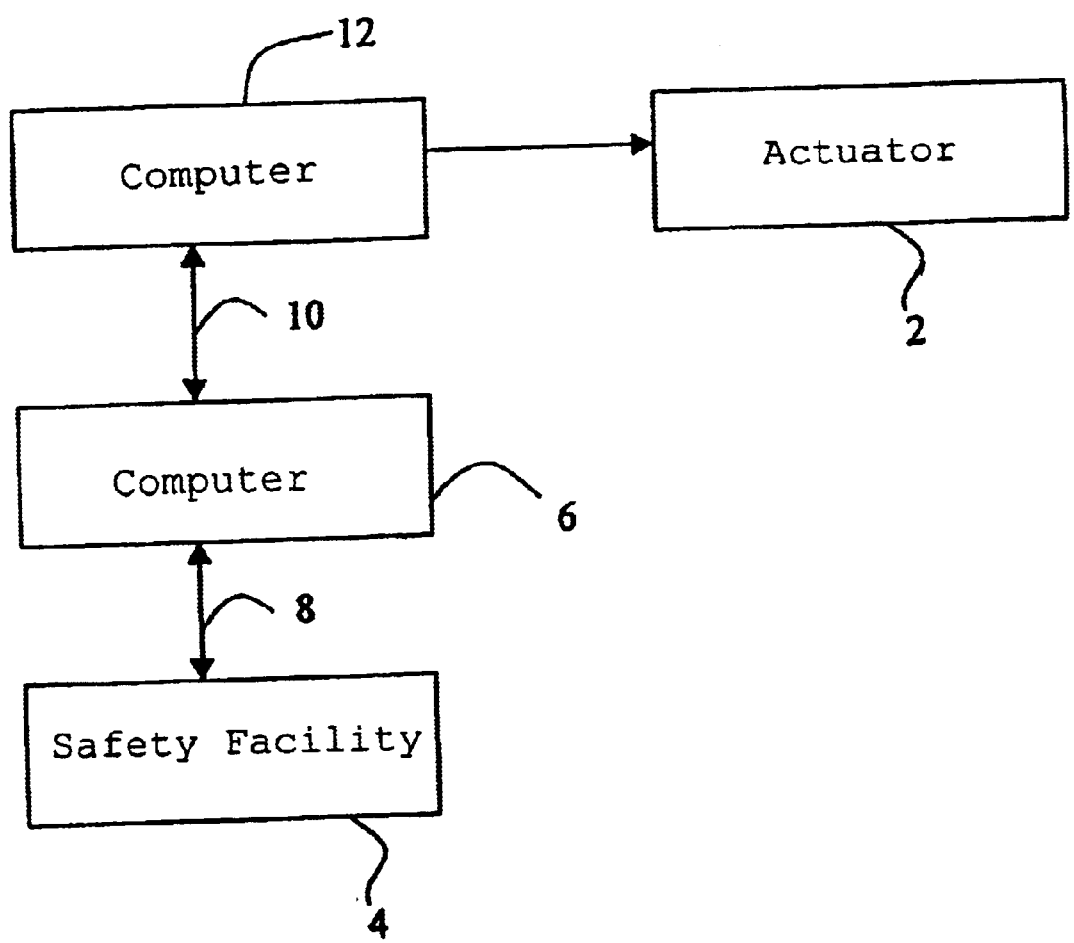

PROCESS FOR MONITORING THE STATE OF A SAFETY FACILITY

BACKGROUND OF THE INVENTION

The present invention relates to a process making it possible to monitor the state of a safety facility.

The present invention finds its application in an architecture managed by a computer and in which an action may be instructed only if a safety facility is in a given state. This type of architecture is very frequent in respect of industrial machines, in the field of home automation, in the automobile field, etc.

An exemplary application of such an architecture is the device for controlling a starter of a motor vehicle. The starter can be actuated only when a steering column lock (safety facility) is in its unlocked state. It must be completely impossible to turn on the engine of the vehicle while the steering column is disabled.

In a motor vehicle, the state of the steering column lock is generally monitored by a first computer. The latter also monitors the state of other facilities in the passenger compartment of the vehicle, such as for example the hand brake or the controls for switching on the headlights. A second computer is intended to manage the functions carried out under the bonnet. The starter receives its orders to turn on from this second computer. A link by CAN bus is effected between the two computers.

Hence, before instructing the starter, the second computer must verify the unlocked state of the column lock. It therefore interrogates the first computer which informs it as to this state. Depending on the response obtained, the second computer does or does not instruct the turning on of the starter.

In the event of a partial failure of the first computer causing it not to verify the state of the column lock, a start command can be sent without the steering column being enabled. Thus a single error of the system may entail a fault.

To solve this problem, the second computer must be capable of monitoring the state of the column lock. The second computer can use the first computer as communication gateway. However, in the event of a fault with the first computer, erroneous information may be sent back to the second computer. The use of such a gateway improves the reliability of the system but insufficiently.

One solution then consists in creating a direct link between the second computer and the steering column lock. Thus, the safety of the system is doubled since the second computer receives the information as to the state of the column lock via two independent routes. The reliability of this solution is satisfactory but its cost is high since it requires the production of new wiring between the second computer and the safety facility. In a motor vehicle, such wiring has to be provided not only with the steering lock but also with other safety facilities.

SUMMARY OF THE INVENTION

The aim of the present invention is therefore to provide a process which allows reliable monitoring of the state of a safety facility without however requiring additional direct wiring.

Accordingly, it proposes a process for monitoring the state of a safety facility via a computer in which a first computer is linked to the safety facility and in which a second computer intended to control an actuator interrogates prior to any command to turn on and/or turn off the actuator the first computer as to the state of the safety facility.

According to the invention, the second computer interrogates the state of the safety facility directly by sending an encrypted message, the first computer forwards in one direction the question of the second computer to the safety facility and in the opposite direction the response of the latter, and the second computer verifies the consistency of the response received, the encryption code being known to the second computer and to the safety facility but being unknown to the first computer.

In this manner, the first computer is called upon to serve solely as a mailbox without being interrogated directly. This makes it possible to pass via the first computer without having to establish a direct line between the second computer and the safety facility while ensuring reliable transmission of information.

In this process according to the invention, provision may be made for the second computer to generate a random number, for the transmission of this number to the safety facility via the first computer to constitute the question and for the response sent to depend on the number transmitted according to a predetermined algorithm corresponding to the encryption code.

For a good link between the computers, they are for example linked together by a bus, for example of CAN type. A serial link may also be envisaged.

The second computer is for example linked to the safety facility by a bus, for example of CAN type. This type of link is commonly used in the automobile field and its implementation is fully perfected.

The process according to the invention can be applied to the case where the safety facility is a steering column lock in an automobile and where the actuator is a starter.

BRIEF DESCRIPTION OF THE DRAWING

The single FIGURE very diagrammatically represents an architecture for the control of a motor vehicle starter as a function of the state of a steering column lock of this motor vehicle.

DETAILED DESCRIPTION OF THE PREFERRED EMBODIMENTS

In this single FIGURE, there is diagrammatically represented the manner in which a starter 2 is actuated as a function of the state of a steering column lock 4 in a motor vehicle.

The state of the steering column lock 4 is monitored by a first computer 6 to which the lock 4 is linked by a CAN bus 8.

This first computer 6 is linked by way of a second CAN bus 10 to a second computer 12. The latter is intended to send operating orders to the starter 2.

The first computer is a computer intended for monitoring the state of control knobs and other facilities located in the passenger compartment of the vehicle. The second computer 12 is here an electronic unit intended to manage the operation of the engine and of the accessories of this engine.

It must not be possible to actuate the starter 2 while the column lock 4 is not in the unlocked position. Specifically, if the starter switches on the vehicle although the lock 4 is disabling the steering column of the vehicle, the automobile can begin to move and it will not be possible to steer it. This is therefore the source of an accident.

The state, locked or unlocked, of the lock 4 is monitored via the first computer 6. Before sending a turn-on order to the starter 2, the second computer 12 therefore interrogates the first computer 6 so as to ascertain what state the lock 4 is in. The second computer thus obtains a first item of information as to the state of the lock 4.

For greater safety, it is preferable for the second computer 12 to obtain an item of information as to the state of the lock 4 in some other way. Specifically, in the event of the malfunctioning of the first computer 6 causing it not to verify the state of the column lock, there is a risk of the second computer 12 receiving an erroneous item of information when it interrogates the first computer 6.

In an original manner, in the present case, the second computer sends an encrypted message to the lock 4. This encrypted message passes via the second bus 10, the first computer 6 and the first bus 8.

The lock which receives this encrypted message sends a likewise encrypted response. The latter is routed to the second computer 12 via the reverse route to that of the question.

The encrypted message sent by the second computer is preferably random. The response sent by the lock is determined by an algorithm as a function of the question received.

It may for example be assumed that the second computer 12 generates a random number. It is agreed that the response sent by the lock 4 when it receives the number transmitted via the second computer 12 should correspond to twice this number when the lock is in its locked state and to three times this number when it is in the unlocked position. The algorithm making it possible to obtain the response as a function of the question is known only to the lock 4 and to the second computer 12. It is unknown to the first computer 6.

The encrypted message which corresponds to the question sent by the second computer 12 is preferably random since if the first computer 6, faulty, were to have to store a response and were to transmit the latter to the second computer 12 during an exchange of data, it is preferable for this recorded response not to be consistent with the question posed.

The second computer 12, when it receives the response from the lock 4, verifies that this response is consistent on the one hand with the question posed and on the other hand with the response which it has received from the first computer 6. If the two responses concur and indicate that the lock 4 is unlocked, a command to turn on the starter is sent to the latter.

In this manner, the second computer can interrogate the state of the lock 4 directly without it being necessary to link this lock 4 directly to the second computer 12. The same communication lines 8, 10 are used to interrogate the state of the lock 4 via two different pathways. Interrogating the state of the lock via two distinct pathways therefore does not require the presence of two distinct hardware lines. Greater safety can then be obtained without modifying the hardware means employed.

The present invention is not limited to the embodiment described hereinabove by way of nonlimiting example nor to its application to the automobile field. This invention also extends to modifications within the competence of the person skilled in the art within the framework of the claims hereinbelow.

Thus, the invention may be generalized to a process making it possible to monitor the state of a safety facility. In the example above, the safety facility is the steering column lock.

Other applications may be found, both in the automobile field (control of an inflatable safety bag for example) and in other industrial fields such as home automation for example.

What is claimed is:

1. Process for monitoring the state of a safety facility via a computer in which a first computer is linked to the safety facility and in which a second computer intended to control an actuator interrogates, prior to any command to turn on and/or turn off the actuator, the first computer as to the state of the safety facility,
    wherein the second computer interrogates the state of the safety facility directly by sending an encrypted message,
    wherein the first computer forwards in one direction the question of the second computer to the safety facility and in the opposite direction the response of the safety facility,
    wherein the second computer verifies the consistency of the response received, and
    wherein the encryption code is known to the second computer and to the safety facility but is unknown to the first computer.

2. Process according to claim 1, wherein the second computer generates a random number,
    wherein the transmission of this number to the safety facility via the first computer constitutes the question and
    wherein the response sent depends on the number transmitted according to a predetermined algorithm corresponding to the encryption code.

3. Process according to claim 1, wherein the two computers are linked together by a bus.

4. Process according to claim 1, wherein the second computer is linked to the safety facility by a bus.

5. Process according to claim 1, wherein the safety facility is a steering column lock in an automobile and the actuator is a starter.

6. Process according to claim 2, wherein the two computers are linked together by a bus.

7. Process according to claim 2, wherein the second computer is linked to the safety facility by a bus.

8. Process according to claim 3, wherein the second computer is linked to the safety facility by a bus.

9. Process according to claim 2, wherein the safety facility is a steering column lock in an automobile and the actuator is a starter.

10. Process according to claim 3, wherein the safety facility is a steering column lock in an automobile and the actuator is a starter.

11. Process according to claim 4, wherein the safety facility is a steering column lock in an automobile and the actuator is a starter.

12. A process for monitoring the state of a safety facility via first and second computers linked to the safety facility, comprising the steps of:
    determining a state of the safety facility using the first computer;
    determining the state of the safety facility using the second computer to directly interrogate the state of the safety facility,
    wherein said determining the state of the safety facility using the second computer step comprises:
    sending an encrypted message to the first computer;
    forwarding the encrypted message from the first computer to the safety facility without decoding the encrypted message;

sending an encrypted response from the safety facility to the first computer;

forwarding the encrypted response from the first computer to the second computer without decoding the encrypted response;

decoding the encrypted response in the second computer to determine the state of the safety facility; and sending a command from the second computer to an actuator to one of turn on and turn off the actuator based on the decoded response.

13. The process according to claim 12, wherein the encrypted message is a random number generated by the second computer, and wherein the encrypted response sent depends on the random number generated according to a predetermined algorithm corresponding to an encryption code.

14. The process according to claims 12 wherein the first and second computers are linked together by a bus.

15. The process according to claims 12, wherein the second computer is linked to the safety facility by a bus.

16. The process according to claim 12, wherein the safety facility is a steering column lock in an automobile and the actuator is a starter in the automobile.

17. The process according to claim 16, wherein the first and second computers are in the automobile.

18. The process according to claim 14, wherein the bus is a CAN type bus.

19. The process according to claim 15, wherein the bus is a CAN type bus.

20. The process according to claim 4, wherein the bus is a CAN type bus.

* * * * *